US010928962B2

(12) United States Patent
Huang et al.

(10) Patent No.: US 10,928,962 B2
(45) Date of Patent: Feb. 23, 2021

(54) ELECTRONIC DEVICE AND TOUCH SENSING MODULE OF ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Ren-Yi Huang, New Taipei (TW); Yuan-Hung Chien, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/519,249

(22) Filed: Jul. 23, 2019

(65) Prior Publication Data

US 2020/0341588 A1 Oct. 29, 2020

(30) Foreign Application Priority Data

Apr. 26, 2019 (CN) ......................... 201910346457.0

(51) Int. Cl.
*G06F 3/044* (2006.01)
*G06F 3/041* (2006.01)
*G06F 3/01* (2006.01)

(52) U.S. Cl.
CPC ............ *G06F 3/0445* (2019.05); *G06F 3/016* (2013.01); *G06F 3/04166* (2019.05)

(58) Field of Classification Search
CPC ...... G06F 3/0414; G06F 3/0416; G06F 3/044; G06F 3/0445; G06F 3/0446; G06F 2203/04105; G06F 2203/04106; G06F 2203/04107; G06F 3/0412
See application file for complete search history.

(56) References Cited

U.S. PATENT DOCUMENTS

2017/0153747 A1* 6/2017 Yoon ..................... G02F 1/1343
2017/0262099 A1* 9/2017 Nathan ................. G06F 3/0414
2019/0102011 A1* 4/2019 Schultz ............... G06F 3/04164

* cited by examiner

*Primary Examiner* — Nelson M Rosario
(74) *Attorney, Agent, or Firm* — ScienBiziP, P.C.

(57) ABSTRACT

A touch sensing module includes a dielectric layer, a first sensing layer, a second sensing layer, and a third sensing layer. The dielectric layer includes a circuit board and an insulating film covering at least two surfaces of the circuit board. The first sensing layer is disposed on a surface of the insulating film facing away from the circuit board. The second sensing layer is disposed on a surface of the insulating film facing away from the circuit board. The third sensing layer is disposed on a side of the second sensing layer facing away from the dielectric layer and spaced apart from the second sensing layer. The first sensing layer and the second sensing layer are respectively disposed on opposite sides of the dielectric layer.

18 Claims, 6 Drawing Sheets

10
17
171 172 173
19
18
16
11
152
151
15
152
12
121
13

ELECTRONIC DEVICE AND TOUCH SENSING MODULE OF ELECTRONIC DEVICE

FIELD

The subject matter herein generally relates to touch sensing modules and devices.

BACKGROUND

Generally, electronic devices having touch functions sense a touch position of a touch applied on a touch sensing module. Some touch sensing modules further include a pressure touch function. However, the pressure touch function and the touch position function generally need to be performed using different components, which requires more space and consumes more energy in operation.

BRIEF DESCRIPTION OF THE DRAWINGS

Implementations of the present disclosure will now be described, by way of embodiments, with reference to the attached figures.

DETAILED DESCRIPTION

Figure 1:
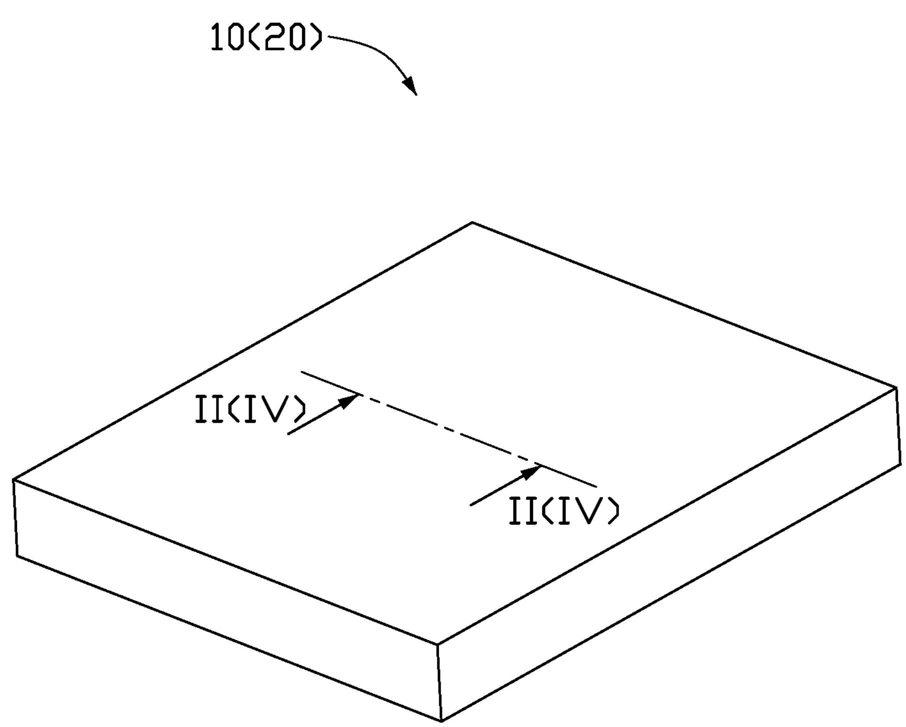
FIG. 1 is an isometric view of an embodiment of a touch sensing module.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
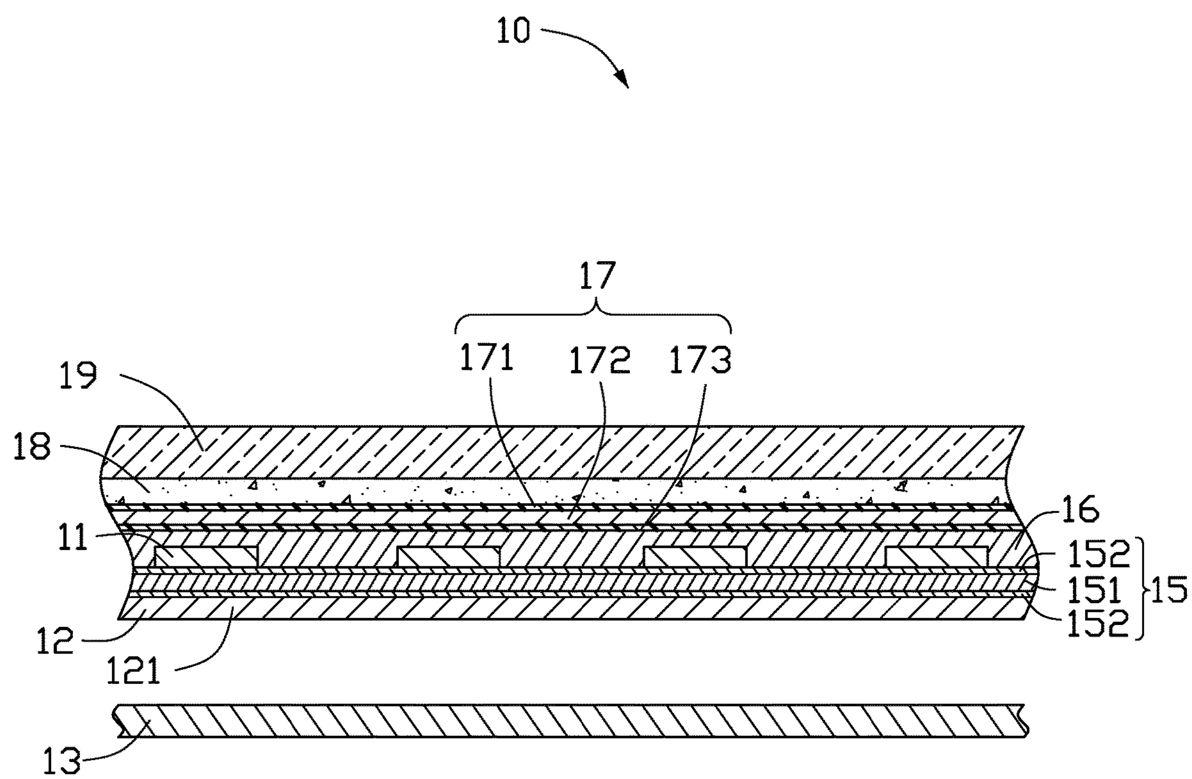
FIG. 2 is a cross-sectional view of a first embodiment of the touch sensing module taken along line II-II in FIG. 1.
Figure 3:
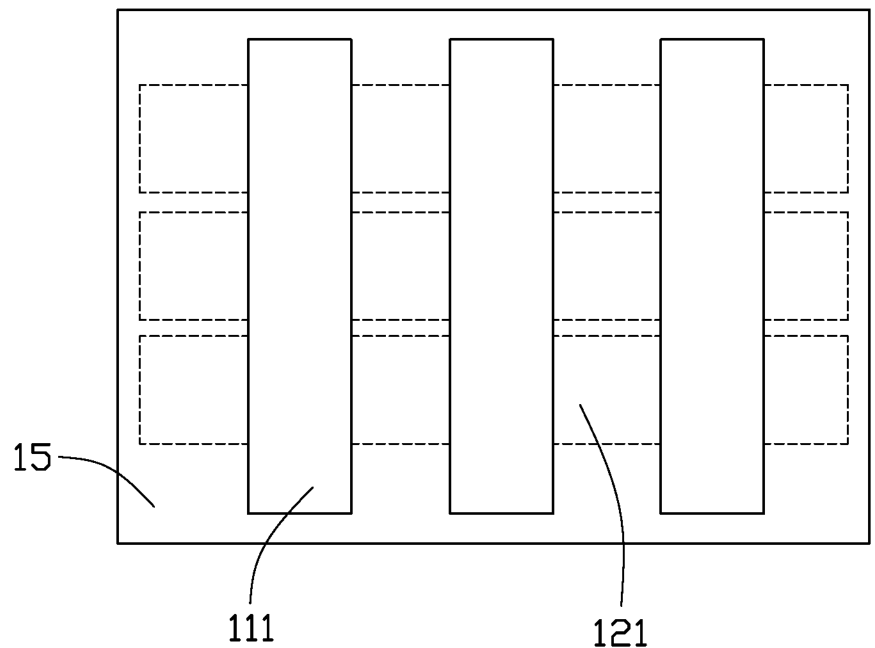
FIG. 3 is a diagram of an arrangement of a first sensing layer and a second sensing layer of the touch sensing module in FIG. 2.

FIGS. 1-3 show a first embodiment of a touch sensing module 10. FIG. 2 is a partial cross-sectional view of the touch sensing module 10 taken along line II-II in FIG. 1. The touch sensing module 10 includes a first sensing layer 11, a second sensing layer 12, a third sensing layer 13, and a dielectric layer 15. The dielectric layer 15 includes a circuit board 151 and an insulating film 152 covering two surfaces of the circuit board 151. The first sensing layer 11 and the second sensing layer 12 are respectively disposed on two surfaces of the insulating film 152 facing away from the circuit board 151. The first sensing layer 11 and the second sensing layer 12 are disposed on opposite sides of the dielectric layer 15, and the third sensing layer 13 is disposed on a side of the second sensing layer 12 facing away from the dielectric layer 15 and spaced apart from the second sensing layer 12.

The dielectric layer 15 is disposed between the first sensing layer 11 and the second sensing layer 12. The circuit board 151 can be a hard circuit board, a flexible circuit board, or a flexible and hard circuit board. The circuit board 151 is used as a signal transmission component of the touch sensing module 10. The touch sensing module 10 can also include a flexible circuit board (not shown) electrically coupled to the circuit board 151. At least part of a surface of the flexible circuit board can be covered by the insulating film 152. One end of the flexible circuit board may electrically couple to a gold finger or an electric pin on the circuit board 151, and a second end of the flexible circuit board may extend to outside of the dielectric layer 15 and be electrically coupled to other components in the touch sensing module 10, such as the first sensing layer 11 and the second sensing layer 12. The insulating film 152 may be an organic material such as polycarbonate (PC), polyimide (PI), polyethylene naphthalate two formic acid glycol ester (PEN), polyparaphenylene, polyethylene glycol terephthalate (PET), and cyclo-olefin polymer (COP). In one embodiment, the insulating film 152 can be disposed on a surface of the circuit board 151 by coating, spin coating, or the like. In one embodiment, the insulating film 152 can be formed having a very low thickness on a surface of the circuit board 151 by spraying or coating. In one embodiment, the insulating film 152 can be formed on the circuit board 151 by physical vapor deposition (PVD), chemical vapor deposition (CVD), or sputtering. The insulating film 152 covers at least bare electrical connection regions of the surface of the circuit board 151 to prevent a short circuit between the first sensing layer 11, the second sensing layer 12 and the circuit board 151.

The first sensing layer 11 and the second sensing layer 12 cooperate with each other for sensing a touch position. The first sensing layer 11 and the second sensing layer 12 are made of electrically conductive materials. A material of the first sensing layer 11 and the second sensing layer 12 may be indium tin oxide (ITO), conductive silver paste, metallic copper, or other metal element or alloy. As shown in FIG. 3, the first sensing layer 11 includes a plurality of spaced apart first sensing units 111, and the second sensing layer 12 includes a plurality of spaced apart second sensing units 121. Each of the plurality of first sensing units 111 and the plurality of second sensing units 121 is substantially strip-shaped, and an extending direction of the first sensing units 111 is substantially perpendicular to an extending direction of the second sensing units 121. A touch position can be determined according to a change in capacitance between the plurality of first sensing units 111 and the plurality of second sensing units 121 at an intersection of the first sensing units 111 and the second sensing units 121 projected on the dielectric layer 15.

The third sensing layer 13 is made of an electrically conductive material, and a capacitance exists between the second sensing layer 12 and the third sensing layer 13. When the touch sensing module 10 is pressed, a distance between the second sensing layer 12 and the third sensing layer 13 changes, thereby changing the capacitance between the second sensing layer 12 and the third sensing layer 13. Thus, a magnitude of pressure can be calculated according to the change in capacitance. In one embodiment, the third sensing layer 13 is a complete continuous structure, that is, the third sensing layer 13 is a whole piece of electrically conductive material. The second sensing layer 12 simultaneously senses the touch position and the magnitude of pressure. The second sensing layer 12 may be driven by time-division cycles, that is, by dividing one cycle into multiple sub-periods, and the second sensing layer 12 senses the touch position and the magnitude of pressure in corresponding adjacent sub-periods.

The touch sensing module 10 further includes a passivation layer 16, a haptic feedback unit 17, an adhesive layer 18, and a cover 19. The passivation layer 16 covers over a side of the first sensing layer 11 facing away from the dielectric layer 15 for protecting the first sensing layer 11, and the passivation layer 16 may be made of an inorganic substance containing silicon (Si). The haptic feedback unit 17 is disposed on a side of the passivation layer 16 facing away from the dielectric layer 15. The haptic feedback unit 17 includes at least a piezoelectric layer 173, a first electrode layer 171, and a second electrode layer 172. The first electrode layer 171 and the second electrode layer 172 are disposed on opposite sides of the piezoelectric layer 173. The second electrode layer 172 is disposed on a side of the passivation layer 16 facing away from the first sensing layer 11. The haptic feedback unit 17 is electrically coupled to the circuit board 151 of the dielectric layer 15. The piezoelectric layer 173 is made of piezoelectric material, such as a piezoelectric ceramic or a piezoelectric organic material. The first electrode layer 171 and the second electrode layer 172 are made of electrically conductive material. The first electrode layer 171 and the second electrode layer 172 are disposed on opposite sides of the piezoelectric layer 173 for applying an electric field to the piezoelectric layer 173 to drive the piezoelectric layer 173 to generate vibration to realize haptic feedback. The cover 19 is disposed on a side of the haptic feedback unit 17 facing away from the passivation layer 16 and is bonded to the haptic feedback unit 17 through an adhesive layer 18. The cover 19 may be made of a flexible material or a non-flexible material. In one embodiment, the cover 19 is made of a flexible organic material such as polycarbonate (PC), polyimide (PI), polyethylene naphthalate two formic acid glycol ester (PEN), polyethylene glycol terephthalate (PET), and cyclo-olefin polymer (COP). The cover 19 may also be made of an inorganic material such as silicon dioxide (SiO2).

Figure 4:
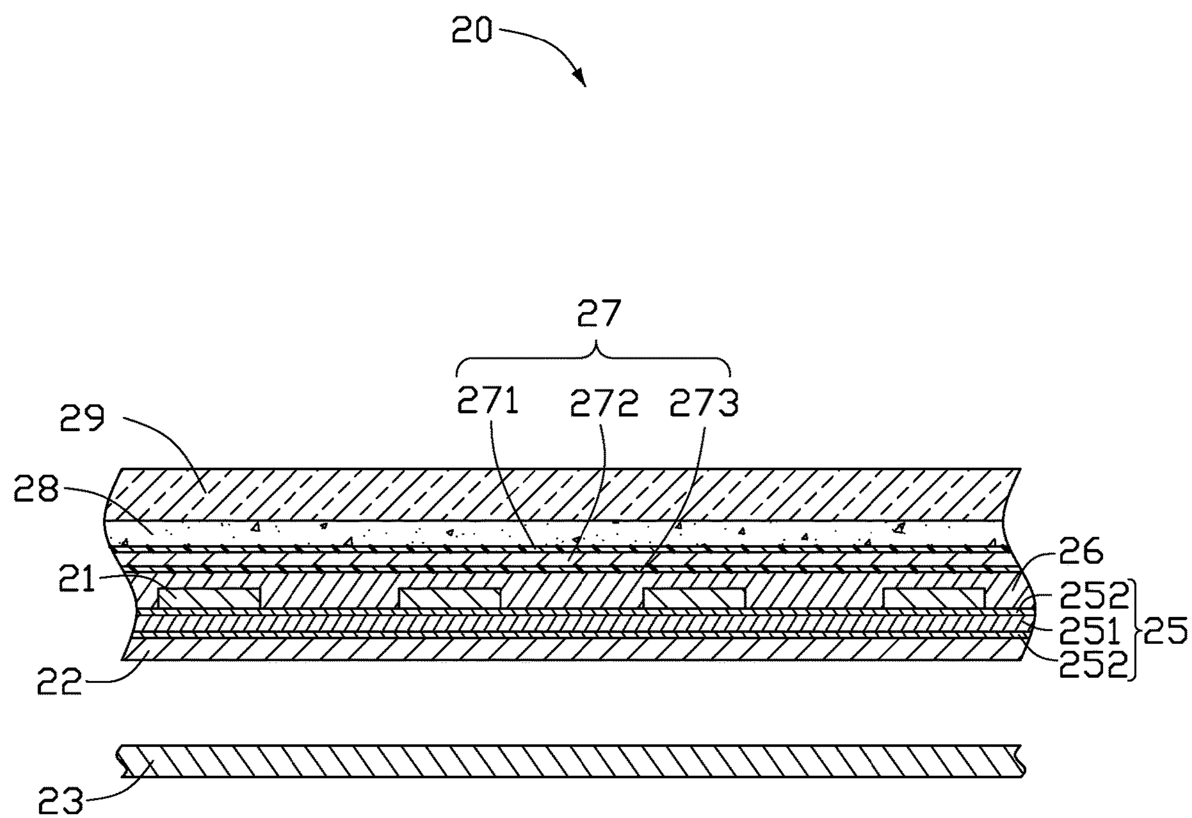
FIG. 4 is a cross-sectional view of a second embodiment of the touch sensing module taken along line II-II in FIG. 1.
Figure 5:
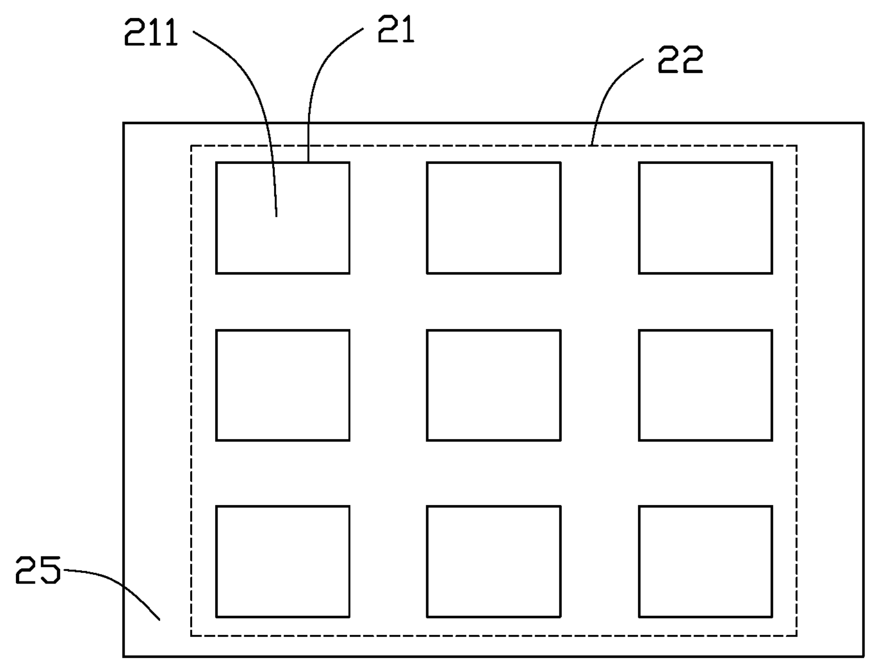
FIG. 5 is a diagram of an arrangement of the first sensing layer and the second sensing layer of the touch sensing module in FIG. 4.

FIGS. 1 and 4-5 show a second embodiment of a touch sensing module 20.

FIG. 4 is a partial cross-sectional view of the touch sensing module 20 taken along line IV-IV in FIG. 1. The touch sensing module 20 includes a first sensing layer 21, a second sensing layer 22, a third sensing layer 23, and a dielectric layer 25. The dielectric layer 25 includes a circuit board 251 and an insulating film 252 covering two surfaces of the circuit board 251. The first sensing layer 21 and the second sensing layer 22 are respectively disposed on two sides of the two insulating film 252 facing away from the circuit board 251. The first sensing layer 21 and the second sensing layer 22 are respectively disposed on opposite sides of the dielectric layer 25, and the third sensing layer 23 is disposed on a side of the second sensing layer 22 facing away from the dielectric layer 25 and is spaced apart from the second sensing layer 22.

The dielectric layer 25 is disposed between the first sensing layer 21 and the second sensing layer 22. The circuit board 251 can be a hard circuit board, a flexible circuit board, or a flexible and hard circuit board. The circuit board 251 is used as a signal transmission component of the touch sensing module 20. The touch sensing module 20 can also include a flexible circuit board (not shown) electrically coupled to the circuit board 251. At least part of a surface of the flexible circuit board can be covered by an insulating film 252. One end of the flexible circuit board may electrically couple to a gold finger or an electric pin on the circuit board 251, and a second end of the flexible circuit board may extend to outside of the dielectric layer 25 and be electrically coupled to other components in the touch sensing module 20, such as the first sensing layer 21 and the second sensing layer 22. The insulating film 252 may be an organic material such as polycarbonate (PC), polyimide (PI), polyethylene naphthalate two formic acid glycol ester (PEN), polyparaphenylene, polyethylene glycol terephthalate (PET), and cyclo-olefin polymer (COP). In one embodiment, the insulating film 252 can be disposed on a surface of the circuit board 251 by coating, spin coating, or the like. In one embodiment, the insulating film 252 can be formed having a very low thickness on a surface of the circuit board 251 by spraying or coating. In one embodiment, the insulating film 252 can be formed on the circuit board 251 by physical vapor deposition (PVD), chemical vapor deposition (CVD), or sputtering. The insulating film 252 covers at least bare electrical connection regions of the surface of the circuit board 251 to prevent a short circuit between the first sensing layer 21, the second sensing layer 22 and the circuit board 251.

The first sensing layer 21 senses a touch position. The first sensing layer 21 is made of an electrically conductive material, such as indium tin oxide (ITO), conductive silver paste, metallic copper, or other metal elements or alloys. As shown in FIG. 5, the first sensing layer 21 includes a plurality of first sensing units 211 disposed at intervals in a matrix configuration. The first sensing units 211 are substantially rectangular block-shaped. A touch position can be determined according to a change in capacitance of the first sensing units 111.

The second sensing layer 22 and the third sensing layer 23 cooperate to sense a magnitude of pressure. The second sensing layer 22 is defined as a zero point of electric potential. The third sensing layer 23 is made of a conductive material. A capacitance exists between the second sensing layer 22 and the third sensing layer 23. When the touch sensing module 20 is pressed, a distance between the second sensing layer 22 and the third sensing layer 23 changes, thereby changing the capacitance between the second sensing layer 22 and the third sensing layer 23. Thus, a magnitude of pressure can be further calculated according to the change in capacitance. In one embodiment, the third sensing layer 23 is a complete continuous structure, that is, the third sensing layer 23 is a whole piece of electrically conductive material.

The touch sensing module 20 further includes a passivation layer 26, a haptic feedback unit 27, an adhesive layer 28, and a cover 29. The passivation layer 26 covers over a side of the first sensing layer 21 facing away from the dielectric layer 25 for protecting the first sensing layer 21, and the passivation layer 26 may be made of an inorganic substance containing silicon (Si). The haptic feedback unit 27 is disposed on a side of the passivation layer 26 facing away from the dielectric layer 25. The haptic feedback unit 27 includes at least a piezoelectric layer 273, a first electrode layer 271, and a second electrode layer 272. The first electrode layer 271 and the second electrode layer 272 are disposed on opposite sides of the piezoelectric layer 273. The second electrode layer 272 is disposed on a side of the passivation layer 26 facing away from the first sensing layer 21. The haptic feedback unit 27 is electrically coupled to the circuit board 251 of the dielectric layer 25. The piezoelectric layer 273 is made of piezoelectric material, such as a piezoelectric ceramic or a piezoelectric organic material. The first electrode layer 271 and the second electrode layer 272 are made of electrically conductive material. The first electrode layer 271 and the second electrode layer 272 are disposed on opposite sides of the piezoelectric layer 273 for applying an electric field to the piezoelectric layer 273 to drive the piezoelectric layer 273 to generate vibration to realize haptic feedback. The cover 29 is disposed on a side of the haptic feedback unit 27 facing away from the passivation layer 26 and is bonded to the haptic feedback unit 27 through an adhesive layer 28. The cover 29 may be made of a flexible material or a non-flexible material. In one embodiment, the cover 29 is made of a flexible organic material such as polycarbonate (PC), polyimide (PI), polyethylene naphthalate two formic acid glycol ester (PEN), polyethylene glycol terephthalate (PET), and cyclo-olefin polymer (COP). The cover 29 may also be made of an inorganic material such as silicon dioxide (SiO2).

Figure 6:
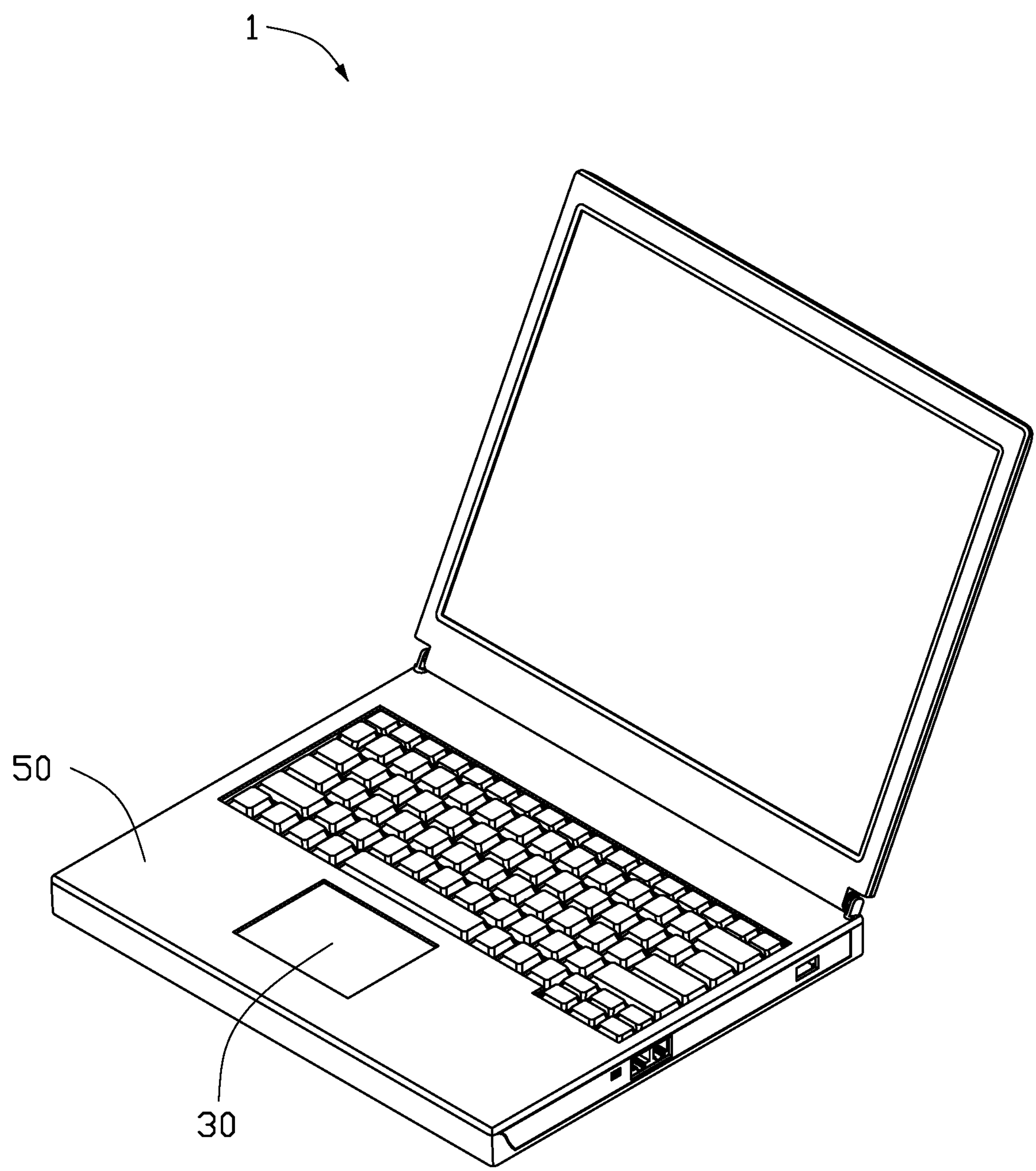
FIG. 6 is an isometric view of an embodiment of an electronic device having the first embodiment or the second embodiment of the touch sensing module.

FIG. 6 shows an embodiment of an electronic device 1. The electronic device 1 may be a notebook computer. The electronic device 1 includes a main body 50 and a touch sensing module 30 disposed in the main body 50. The touch sensing module 30 can be used as a touch panel of the notebook computer. The touch sensing module 30 may be the touch sensing module 10 of the first embodiment or the touch sensing module 20 of the second embodiment.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A touch sensing module comprising:

a dielectric layer comprising a circuit board and an insulating film covering at least two surfaces of the circuit board;

a first sensing layer disposed on a surface of the insulating film facing away from the circuit board;

a second sensing layer disposed on a surface of the insulating film facing away from the circuit board; and a third sensing layer disposed on a side of the second sensing layer facing away from the dielectric layer and spaced apart from the second sensing layer; wherein:

the first sensing layer and the second sensing layer are respectively disposed on opposite sides of the dielectric layer;

a touch position is determined according to a change in capacitance between the first sensing layer and the second sensing layer or according to a change in capacitance of first sensing units of the first sensing layer;

a magnitude of pressure is calculated according to a change in capacitance between the second sensing layer and the third sensing layer;

the third sensing layer is a complete continuous structure;

the second sensing layer is driven by time-division cycles, each of the time-division cycles being divided into multiple sub-periods;

the second sensing layer senses the touch position and the magnitude of pressure in corresponding adjacent sub-periods.

2. The touch sensing module of claim 1, further comprising:

a passivation layer covered over the first sensing layer; and a haptic feedback unit disposed on a side of the passivation layer facing away from the first sensing layer.

3. The touch sensing module of claim 2, wherein:

the haptic feedback unit comprises a piezoelectric layer, a first electrode layer, and a second electrode layer;

the first electrode layer and the second electrode layer are respectively disposed on opposite sides of the piezoelectric layer;

the second electrode layer is disposed on a side of the passivation layer facing away from the first sensing layer.

4. The touch sensing module of claim 1, wherein:

the first sensing layer and the second sensing layer are made of electrically conductive material.

5. The touch sensing module of claim 4, wherein:

the third sensing layer is made of an electrically conductive material;

a capacitance exists between the second sensing layer and the third sensing layer; and when the touch sensing module is pressed, a distance between the second sensing layer and the third sensing layer changes, a capacitance between the second sensing layer and the third sensing layer changes, and a magnitude of pressure is calculated according to the change in capacitance.

6. The touch sensing module of claim 5, wherein:

the first sensing layer comprises a plurality of first sensing units, the plurality of first sensing unit being spaced apart from each other;

the second sensing layer comprises a plurality of second sensing units, the plurality of second sending units being spaced apart from each other each of the plurality of first sensing units and the plurality of second sensing units is strip-shaped;

an extending direction of the plurality of first sensing units is perpendicular to the extending direction of the plurality of second sensing units;

a touch position is determined according to a change in capacitance between the plurality of first sensing units and the plurality of second sensing units at an intersection of the first sensing units and the second sensing units projected on the dielectric layer.

7. The touch sensing module of claim 6, wherein:
the third sensing layer is made of an electrically conductive material;
a capacitance exists between the second sensing layer and the third sensing layer; and
when the touch sensing module is pressed, a distance between the second sensing layer and the third sensing layer changes, a capacitance between the second sensing layer and the third sensing layer changes, and a magnitude of pressure is calculated according to the change in capacitance.

8. The touch sensing module of claim 5, wherein:
the first sensing units of the first sensing layer are arranged in a matrix configuration and are spaced apart from each other;
the second sensing layer is a continuous structure.

9. The touch sensing module of claim 8, wherein:
the second sensing layer is defined as a zero point of electric potential.

10. An electronic device comprising a touch sensing module, the touch sensing module comprising:
a dielectric layer comprising a circuit board and at least one insulating film covering at least two surfaces of the circuit board;
a first sensing layer disposed on a surface of the insulating film facing away from the circuit board;
a second sensing layer disposed on a surface of the insulating film facing away from the circuit board; and
a third sensing layer disposed on a side of the second sensing layer facing away from the dielectric layer and spaced apart from the second sensing layer; wherein:
the first sensing layer and the second sensing layer are respectively disposed on opposite sides of the dielectric layer;
a touch position is determined according to a change in capacitance between the first sensing layer and the second sensing layer or according to a change in capacitance of first sensing units of the first sensing layer;
a magnitude of pressure is calculated according to a change in capacitance between the second sensing layer and the third sensing layer;
the third sensing layer is a complete continuous structure;
the second sensing layer is driven by time-division cycles, each of the time-division cycles being divided into multiple sub-periods;
the second sensing layer senses the touch position and the magnitude of pressure in corresponding adjacent sub-periods.

11. The touch sensing module of claim 10, further comprising:
a passivation layer covered over the first sensing layer; and
a haptic feedback unit disposed on a side of the passivation layer facing away from the first sensing layer.

12. The touch sensing module of claim 11, wherein:
the haptic feedback unit comprises a piezoelectric layer, a first electrode layer, and a second electrode layer;
the first electrode layer and the second electrode layer are respectively disposed on opposite sides of the piezoelectric layer;
the second electrode layer is disposed on a side of the passivation layer facing away from the first sensing layer.

13. The touch sensing module of claim 12, wherein:
the first sensing layer and the second sensing layer are made of electrically conductive material.

14. The touch sensing module of claim 13, wherein:
the third sensing layer is made of an electrically conductive material;
a capacitance exists between the second sensing layer and the third sensing layer; and
when the touch sensing module is pressed, a distance between the second sensing layer and the third sensing layer changes, a capacitance between the second sensing layer and the third sensing layer changes, and a magnitude of pressure is calculated according to the change in capacitance.

15. The touch sensing module of claim 14, wherein:
the first sensing layer comprises a plurality of first sensing units, the plurality of first sending units being spaced apart from each other;
the second sensing layer comprises a plurality of second sensing units, the plurality of second sending units being spaced apart from each other;
each of the plurality of first sensing units and the plurality of second sensing units is strip-shaped;
an extending direction of the plurality of first sensing units is perpendicular to the extending direction of the plurality of second sensing units;
a touch position is determined according to a change in capacitance between the plurality of first sensing units and the plurality of second sensing units at an intersection of the first sensing units and the second sensing units projected on the dielectric layer.

16. The touch sensing module of claim 15, wherein:
the third sensing layer is made of an electrically conductive material;
a capacitance exists between the second sensing layer and the third sensing layer; and
when the touch sensing module is pressed, a distance between the second sensing layer and the third sensing layer changes, a capacitance between the second sensing layer and the third sensing layer changes, and a magnitude of pressure is calculated according to the change in capacitance.

17. The touch sensing module of claim 14, wherein:
the first sensing units of the first sensing layer are arranged in a matrix configuration and are spaced apart from each other;
the second sensing layer is a continuous structure.

18. The touch sensing module of claim 17, wherein:
the second sensing layer is defined as a zero point of electric potential.

* * * * *